US005524329A

United States Patent [19]
Schmalzel

[11] Patent Number: 5,524,329
[45] Date of Patent: Jun. 11, 1996

[54] TACK-OFF MACHINE

[75] Inventor: Dennis Schmalzel, Allengton, Mich.

[73] Assignee: Autotac Inc., Troy, Mich.

[21] Appl. No.: 368,499

[22] Filed: Jan. 4, 1995

[51] Int. Cl.⁶ .................. A47L 9/02; A47L 9/10
[52] U.S. Cl. .......................... 15/312.1; 15/415.1
[58] Field of Search .................. 15/308, 312.1, 15/415.1

[56] References Cited

U.S. PATENT DOCUMENTS

| | | | |
|---|---|---|---|
| 2,800,677 | 7/1957 | Peterson | 15/308 |
| 4,689,749 | 8/1987 | Glogowski | 15/53.3 |
| 4,760,620 | 8/1988 | Lamore . | |
| 4,934,018 | 6/1990 | Fortier et al. | 15/312.1 |
| 4,941,230 | 7/1990 | Lamore . | |
| 5,405,450 | 4/1995 | Mifsud | 15/308 |

Primary Examiner—David Scherbel
Assistant Examiner—Randall E. Chin
Attorney, Agent, or Firm—Gifford, Krass, Groh, Sprinkle, Patmore, Anderson & Citkowski

[57] ABSTRACT

A tack-off system for cleaning vehicular bodies eliminates the presence of exposed, flexible conduit at locations above the path of travel of the vehicle therethrough. Additionally, the apparatus includes a positioning system which allows the tack-off brushes to be moved in relation to the vehicular bodies, without changing the positional orientation of the brush assembly with regard thereto. Also, the system includes a vortex enhanced plenum utilized to evacuate ambient air and contaminant particles.

17 Claims, 6 Drawing Sheets

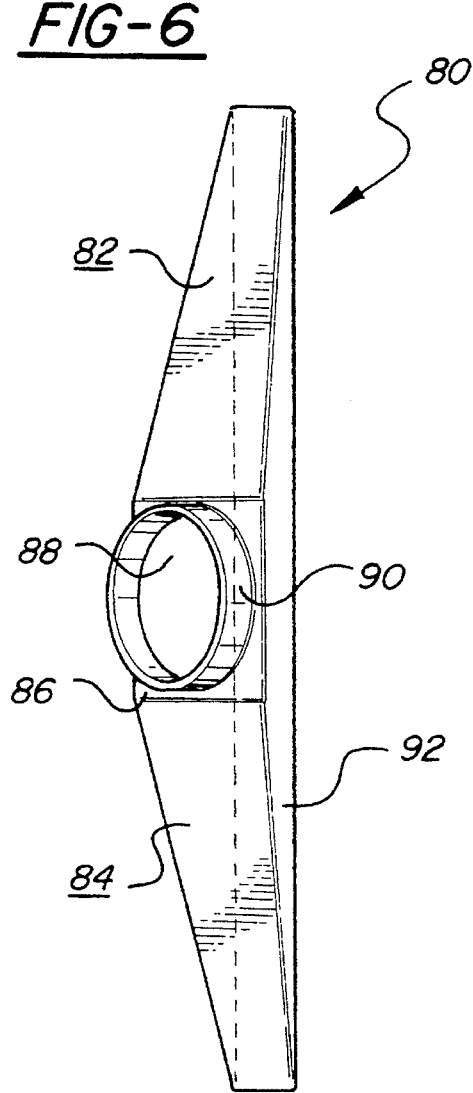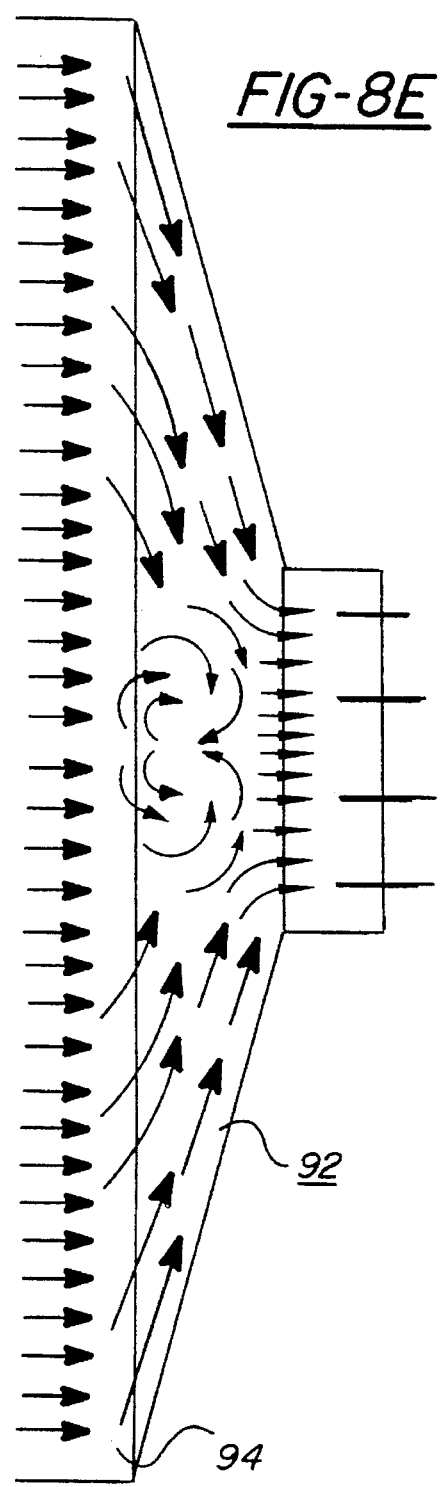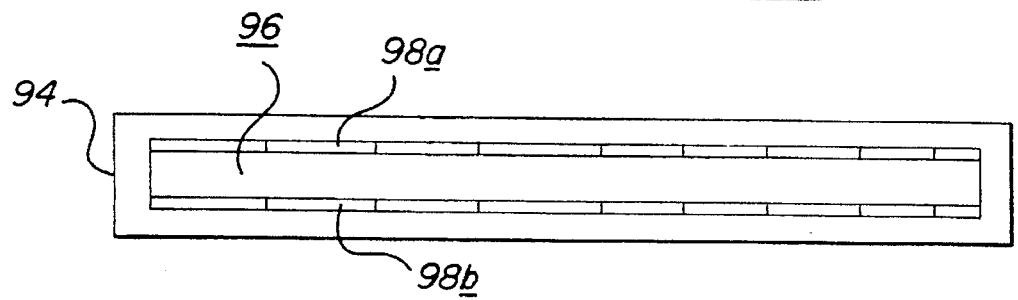

TACK-OFF MACHINE

FIELD OF THE INVENTION

This invention relates generally to a cleaning apparatus for the removal of dust, lint and other particulate matter from surfaces prior the painting, lacquering or other coating thereof. In particular, the present invention relates to an automated tacking machine for cleaning motor vehicle bodies prior to painting.

BACKGROUND OF THE INVENTION

It is very important to remove dust, lint and other such particulate matter from surfaces prior to their painting, since such contaminants can produce a variety of blemishes in the final painted finish. Cleaning is particularly important in those instance where it is desirable to achieve large area, high quality painted finishes, as for example in the manufacture of motor vehicles. It is essential that any pre-painting cleaning process not mar the vehicle or introduce any new contaminants. Furthermore, it is desirable that any cleaning process be compatible with high volume automated manufacturing techniques.

Originally, pre-painting cleaning was carried out by wiping the surfaces with cloths impregnated with a tacky material, and hence, all such cleaning processes are generally referred to as "tacking" or "tack-off" processes. Cloth based processes have been found to be generally unsatisfactory, and the art has turned to various brush based systems. Apparatus of this type generally comprises a rotating brush which is swept across the surface to be cleaned. The brush removes dust particles which are collected by a vacuum. One such prior art system particularly adapted for cleaning motor vehicle bodies is shown in U.S. Pat. No. 4,689,749.

A number of problems have been encountered with prior art tack-off systems, particularly as applicable to the manufacture of motor vehicles. Brush positioning and control is critical, since it is necessary that the brush sweep the entire vehicle surface. However, it is important to avoid inadvertent collision of the brush with the vehicle. The brushes are typically manufactured from ostrich feathers and are expensive and fragile; furthermore, an inadvertent collision can also mar the vehicle surface. Problems of brush control are further complicated by the fact that most vehicular bodies are of fairly complicated design, and in most instances, a particular tack-off system will be employed to prepare a number of different vehicular body types. It is also most important that any tack-off machine not introduce any new contaminants to the cleaned vehicle surface. In many prior art tack-off machines, the vacuum collection system includes a number of flexible conduits, and these conduits are frequently disposed in a location above the path of travel of the vehicle being cleaned, and one such prior art system having overhead conduits is shown in U.S. Pat. No. 4,689,749. In accord with the present invention, it has been found that these conduits can become a significant source of contamination. The present invention recognizes that it is important to properly position, and eliminate the number of conduits in a tack-off system in order to prevent recontamination of the cleaned surfaces.

As will be described in greater detail hereinbelow, the present invention provides an improved tack-off machine which accurately controls brush position to maximize cleaning effect while minimizing the possibility of marring the vehicular surface. The machine of the present invention also provides improved cleaning efficiency and prevents recontamination of the cleaned surface by optimizing the configuration of collection conduits. These and other advantages of the present invention will be readily apparent from the drawings, discussion and description which follow.

BRIEF DESCRIPTION OF THE INVENTION

There is disclosed herein a tack-off machine which includes a cylindrical tack-off brush rotatable about an axis thereof, an exhaust hood surrounding a portion of the circumference of the brush and an exhaust plenum in communication with the hood. The plenum is a vortex moderated exhaust plenum having a top wall with an exhaust port defined therein, a bottom wall having an exhaust slit defined therein, and first side wall and a second side wall. The walls are configured and disposed in cooperation to define an interior volume which is tapered along three mutually perpendicular axes so that the narrowest width dimension and the greatest length dimension of the interior volume are closest to the bottom wall, and the greatest width dimension and the shortest length dimension of the interior volume are closest to the top wall. The plenum is configured so that when air is drawn through the exhaust slot and out of the exhaust port, a variable region of turbulent flow is created in the interior volume. The turbulent flow has a maximum value proximate the exhaust port and a minimum value distal the exhaust port. This turbulent flow creates a variable choke effect along the length of the slot so that the velocity of the air flowing therethrough is constant along the length. In accord with another aspect of the invention tack-off machines for cleaning vehicles which pass along the path of travel therethrough includes a support frame defining an opening configured to permit the vehicle to pass therethrough, a generally cylindrical top, tack-off brush supported on the frame for rotation about an axis transverse to the path of travel of the vehicle, a drive system for rotating the brush and an exhaust hood disposed so as to surround a portion of the circumference of the brush. The system further includes an exhaust blower and a flexible, expansible, exhaust conduit disposed to convey an exhaust stream from the hood to the blower. The conduit is supported and enclosed within the frame so that the conduit does not pass over the vehicle as the vehicle passes through the tack-off machine.

In accord with another aspect of the present invention the tack-off machine includes a support linkage for pivotably attaching an exhaust hood associated with a cylindrical brush to the frame. The support linkage includes a first and a second arm disposed in a spaced apart relationship. Each arm has a first end pivotably connected to the frame and a second end pivotally connected to the hood. The linkage further includes an actuator in mechanical communication with the hood for pivoting the hood on the frame. In this linkage, the first and second arm cause the hood and frame to maintain a fixed angular relationship as the hood is pivoted so that the contact point of the brush with a vehicle passing there past, does not change.

BRIEF DESCRIPTION OF THE DRAWINGS

FIG. 6 is a perspective view of an exhaust plenum of the present invention;

FIG. 7 is a bottom view of the plenum of FIG. 6;

FIGS. 8A–8E are cross sectional views of the plenum of FIG. 6; and

DETAILED DESCRIPTION THE INVENTION

Figure 1:
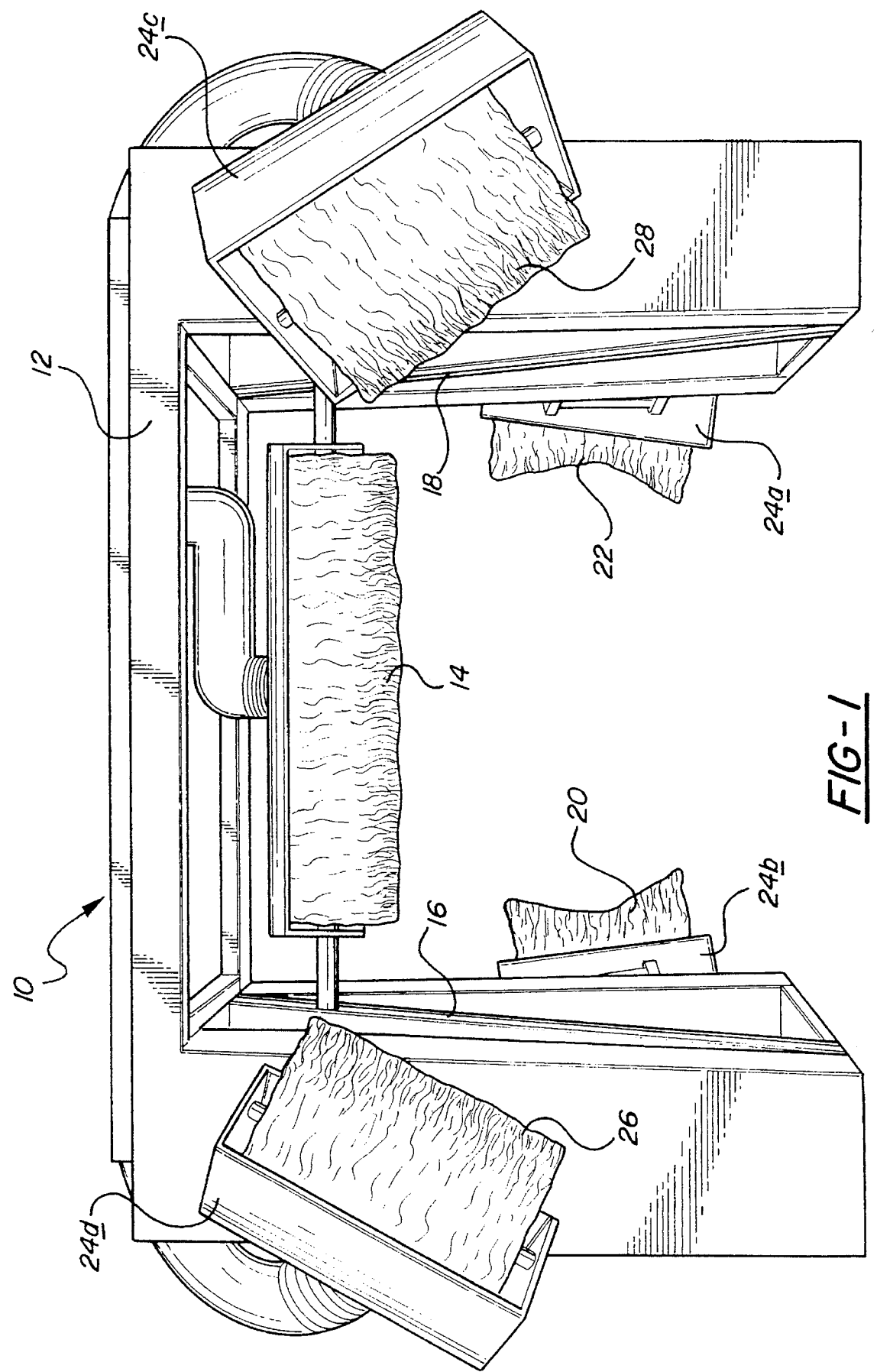
FIG. 1 is a perspective view of one embodiment of tack-off machine of the present invention.

Referring now to FIG. 1, there is shown a perspective view of a tack-off machine 10 of the present invention looking in a direction along the path of travel which a motor vehicle would follow through the machine. Typically, the vehicle would be traveling through the machine in a direction toward the viewer. The machine 10 of FIG. 1 includes a support frame 12 configured as a cross member supported by a pair of pillars so as to define an opening large enough for a vehicle to pass through. A generally cylindrical top tack-off brush 14 is supported on the frame 12 for rotation about an axis which is generally transverse to the path of travel a vehicle would take through the machine 10. In the context of the present disclosure, the top brush 14, as well other brushes in the machine are described as being generally cylindrical, and it is to be understood that in some instances, the diameter of the brush may vary along its length, and such tapered or stepped cylindrical brushes are also included within the designation of generally cylindrical brushes. The brushes employed in the present invention will typically be conventionally employed tack-off brushes, such as ostrich feather brushes, although it is to be understood that the present invention is not limited to the use of such brushes and can be employed in combination with a variety of brush materials.

The top brush 14 is supported on the frame 12 in a pair of tracks 16, 18 which guide the brush along a path of travel which is generally inclined at an acute angle relative to the path of travel of the vehicle. As illustrated, the tracks 16, 18 slope forwardly along the path of travel of the vehicle. In this manner, the brush 14 may be raised and lowered so as to contact various portions of the vehicle body, and the forward inclination permits the brush 14 to follow the vehicle as it travels through the support frame 12, thereby allowing for efficient cleaning of the vehicle's back surface.

The machine of FIG. 1 also includes two sets of side brushes. The first set of brushes 20, 22 are disposed with their axes of rotation in a generally vertical direction and are positioned to contact the lower side portions of the vehicle. It will be noted that these brushes 20, 22 are tapered cylindrical brushes. As will be described in greater detail hereinbelow, the brushes 20, 22 are each partially surrounded by an exhaust hood 24, and are pivotally mounted to allow for optimum contact with the vehicle. A second set of side mounted brushes 26, 28 are disposed with their axes of rotation inclined relative to the vertical and are positioned to permit cleaning of the upper side surfaces of the vehicle. These brushes are also disposed within exhaust hoods 24 and are pivotally mounted as previously described.

Figure 2:
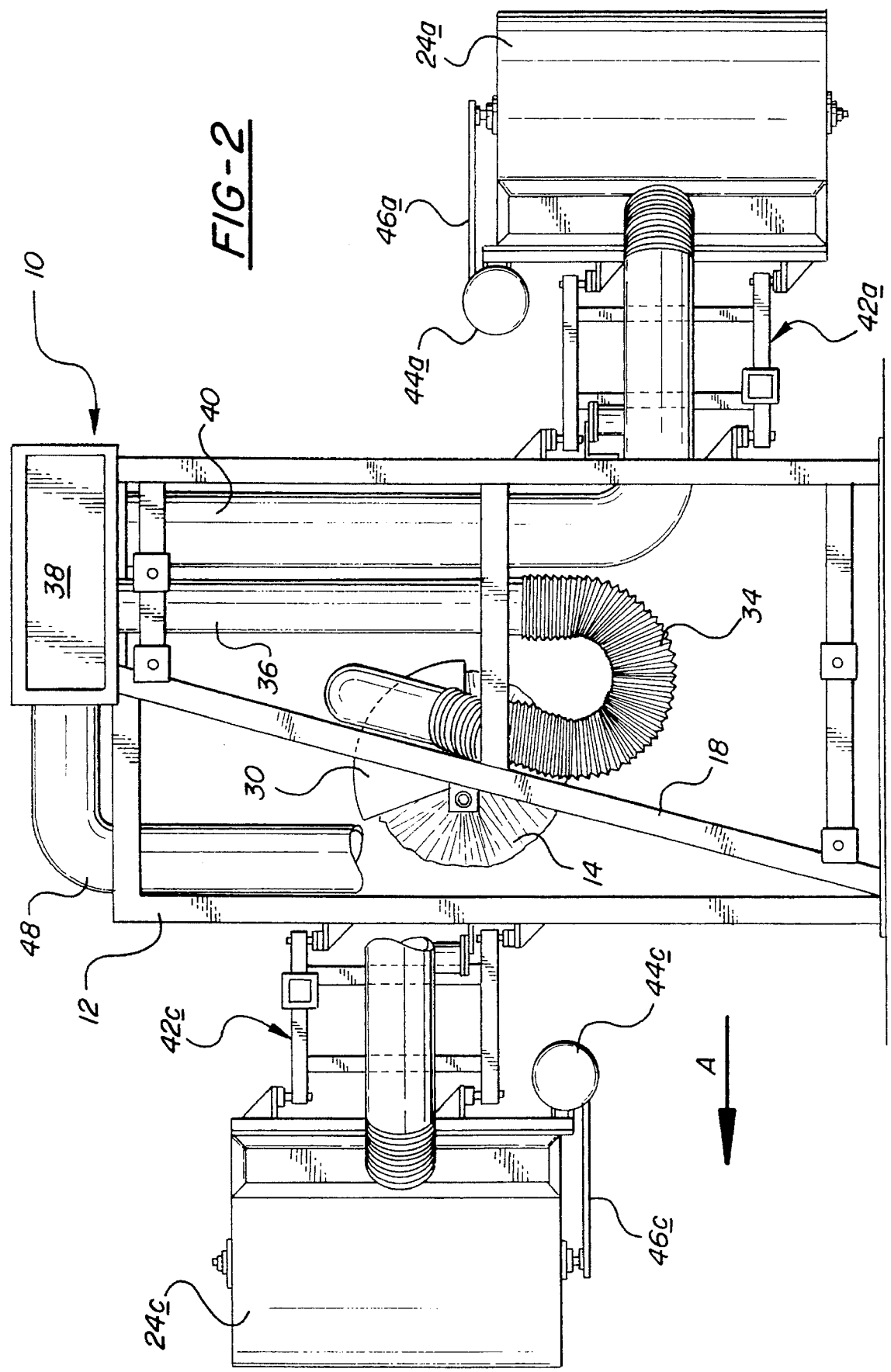
FIG. 2 is a cut away, side view of the machine of FIG. 1.

Referring now to FIG. 2, there is shown a side view of the machine 10 of FIG. 1 with the end panel of the support frame 12 cut away. FIG. 2 specifically illustrates the manner in which the top brush 14 is supported by the inclined track 18 so as to be movable along a path of travel which slopes downwardly and forwardly in relation to the path of travel of the motor vehicle through the apparatus, which path is generally indicated by arrow A.

The top brush 14 has a portion of its circumference enclosed by an exhaust hood 30, and this hood has an exhaust plenum 32 extending therealong. The plenum 32 extends into a housing as defined by the upright pillar of the support frame 12 and therein couples to a flexible, expansible conduit 34. The expansible conduit 34 connects to an exhaust duct 36, which in turn connects to an exhaust manifold 38 coupled to a blower or other such device, not shown, which evacuates ambient air from the manifold 38, duct 36, conduit 34, plenum 32 and hood 30. The flexible conduit 34 permits the brush 14 to move along the inclined rail 18 while maintaining air flow through the system.

It is notable that the flexible conduit 34 is disposed within the support pillar and is not at any location above the path of travel of a vehicle through the support frame. It has been found that the flexible conduit can be a significant source of secondary contamination. The conduit can attract and retain contaminant particles from the ambient atmosphere onto its exterior surface, and these particles will then be released as the conduit flexes. Additionally, the conduit material itself can be a source of contamination. In many instances, the conduit is fabricated from a wire reinforced body of coated fabric, which degrades to produce particulate contamination. The present invention significantly reduces secondary contamination by reducing the amount of flexible conduit employed in the machine and by eliminating the presence of any flexible conduit which is disposed immediately above a vehicle passing therethrough.

Various modifications of the FIG. 2 system may be implemented in accord with the present invention. The manifold 38 may be expanded so as to project into the upright pillar of the support frame 12, and in this manner replace the top exhaust duct 36 as well as a large portion of the side exhaust duct 40. Other corresponding modifications will be readily available to one of skill in the art.

FIG. 2 further illustrates the lower side brush hood 24a and the upper side brush hood 24c together with their respective support linkages 42a, 42c which pivotally mount them to the support frame 12, and which will be described in greater detail hereinbelow. Each brush assembly includes a motor 44 and associated drive belt 46 for rotating the associated brush.

The lower side brush hood 24a is in communication with the evacuation manifold 38 via a duct 40 through a communication established by a short length of flexible conduit extending therebetween. In the FIG. 2 illustration, the conduit has been omitted for the sake of clarity. In a similar manner, the upper side brush hood 24c communicates with the manifold 38 via a duct 48 and a length of flexible conduit, also omitted.

Figure 3:
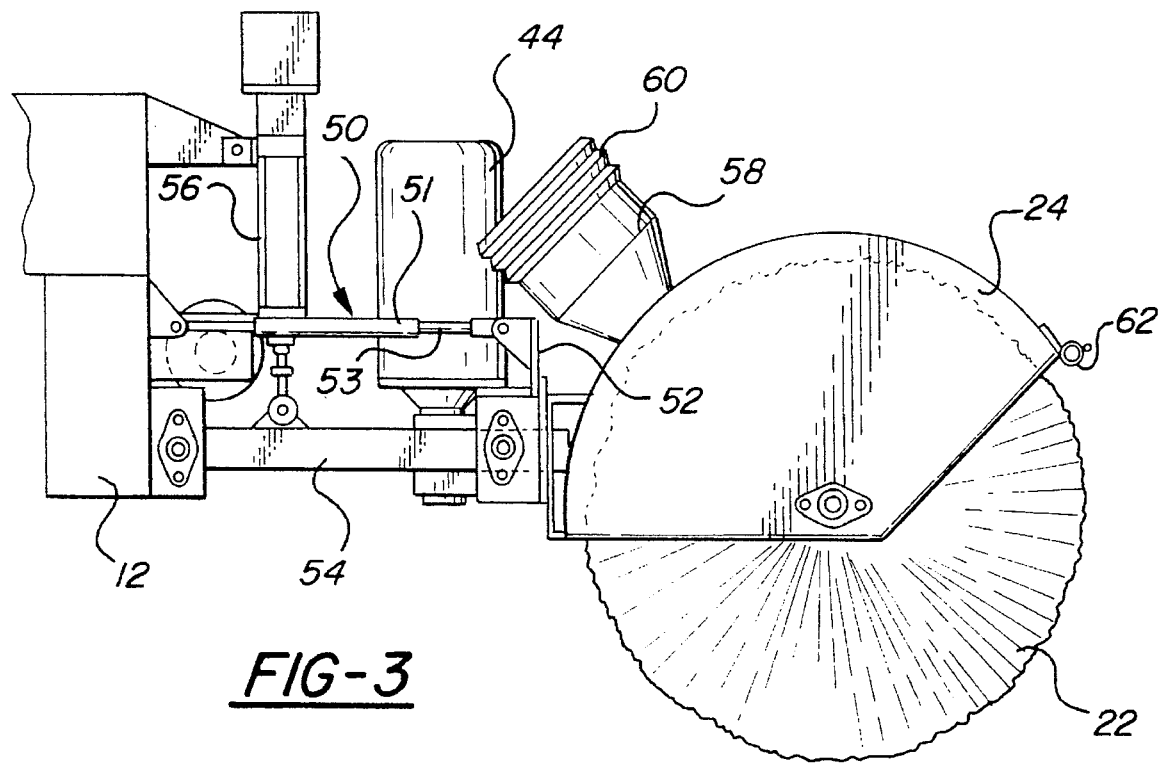
FIG. 3 is a top view of a side brush of the FIG. 1 machine illustrating the pivotal mounting thereof.
Figure 4:
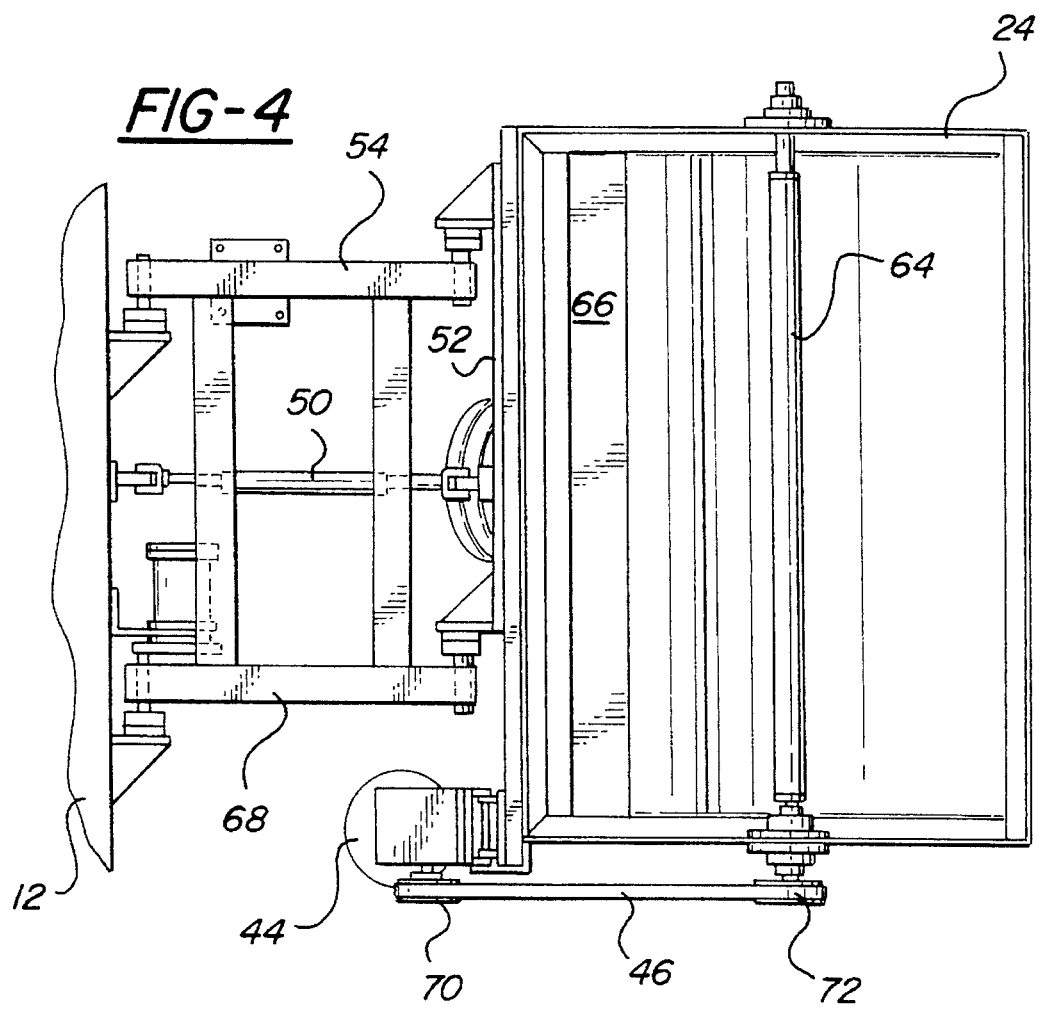
FIG. 4 is a side view of the brush and mount of FIG. 3.

As mentioned above, it is important to properly position the brushes in a tack-off apparatus so as to optimize the cleaning process and to prevent damage to the vehicle or to the brush from inadvertent collisions. In accord with another aspect of the present invention, there is provided a linkage mechanism which controls and directs brush assemblies, particularly the side brush assemblies of the tack-off machine. Referring now to FIGS. 3 and 4, there are shown top, and side views respectively of a brush assembly of the present invention illustrating the positioning linkage therefor.

Shown in FIG. 3 is a brush assembly including an exhaust hood 24 which as previously described, is configured to extend along the length of a cylindrical brush 22 and enclose a portion of the circumference thereof. The hood 24 is pivotally supported upon the frame 12 by means of a support linkage. The support linkage includes a first arm 50 which has a first one of its ends pivotally connected to the frame 12 and a second one of its ends pivotally connected to the hood 24, in this instance through a support bracket 52; although, it is to be understood that connection may be directly to the hood or otherwise. The support linkage also includes a second arm 54 which is spaced from the first arm 50 and which also has its first end connected to the support frame 12 and its second end connected to the hood 24 through the bracket 52. The brush assembly further includes an actuator 56, which in this instance is an electrically powered linear actuator, coupled to the second arm 54, for moving the hood 24 and brush 22.

The support linkage permits the hood to pivot back and forth with relation to the path of travel of a motor vehicle through the tack-off machine, while maintaining a fixed angular relationship between the hood 24 and support frame 12. As will be explained in further detail hereinbelow, the retention of the fixed angular relationship assures that the contact point of the brush 22 and the vehicle remains constant as the brush is repositioned; furthermore, the positional relationship of the hood 24 and vehicle is also unchanged thereby assuring optimum operation of the tack-off system and preventing damage to the vehicle.

In the illustrated embodiment, the first arm 50 is configured so that its length may be adjusted, and toward that end, the first arm comprises an internally threaded sleeve portion 51 and a threaded shaft 53. The shaft 53 engages the sleeve 51, and it will be appreciated that the overall length of the arm 50 may be adjusted by disconnecting one of the ends of the arm 50 from the support 12 or the bracket 52 and unscrewing the shaft 51 and sleeve 53 relative to one another. In this manner, the angular relationship of the hood 24 and support 12 may be adjusted to accommodate varying ranges of vehicular dimensions. Once adjusted, the angular relationship is maintained as the hood 24 and brush 22 are pivoted by the support linkage.

As will be noted from FIG. 3, the hood 24 further includes an exhaust plenum 58 having a flexible conduit 60 attached thereto, and in the illustration, only a portion of the conduit 60 is shown. The hood 24 further includes an ionization source 62, which in this embodiment comprises an electrically energized ion source. The ion source 62 neutralizes static electrical charges on the brush and/or automotive vehicle to thereby control the collection of dust particles and prevent their redeposition upon the vehicle. A variety of ion sources are known in the art and may be employed in the practice of the present invention.

Referring now to FIG. 4, there is shown a side elevational view of the brush assembly depicted in FIG. 3. It should be noted that in FIG. 4, the brush has been removed from the hood 24 although the brush mounting shaft 64 is shown in the hood 24. Also visible in the FIG. 4 drawing is an exhaust slot 66 disposed in the hood. The slot leads to the exhaust plenum 58 and provides for withdrawal of ambient air and entrained contaminant particles from the hood 24.

FIG. 4 also depicts the first arm 50 and better shows the manner in which it is pivotally attached to the support 12 and mounting bracket 52. It will be noted from the Figure that the second arm 54 is not only laterally spaced from the first arm 50, but is vertically displaced therefrom, and the support linkage also includes a third arm 68 which is vertically displaced from, but rigidly affixed to, the second arm 54. The third arm 68 and second arm 54 cooperate to provide rigid support for the hood, and essentially operate as a single arm, and in view thereof it will be appreciated that other linkages may be similarly employed. For example, additional arms, aligned with arm 54 and arm 68 may be employed, or the two arms may be replaced by a single member. FIG. 4 further depicts a drive motor 44 which operates to rotate the brush through a drive belt 46 and a pair of drive pulleys 70, 72.

Figure 5A:
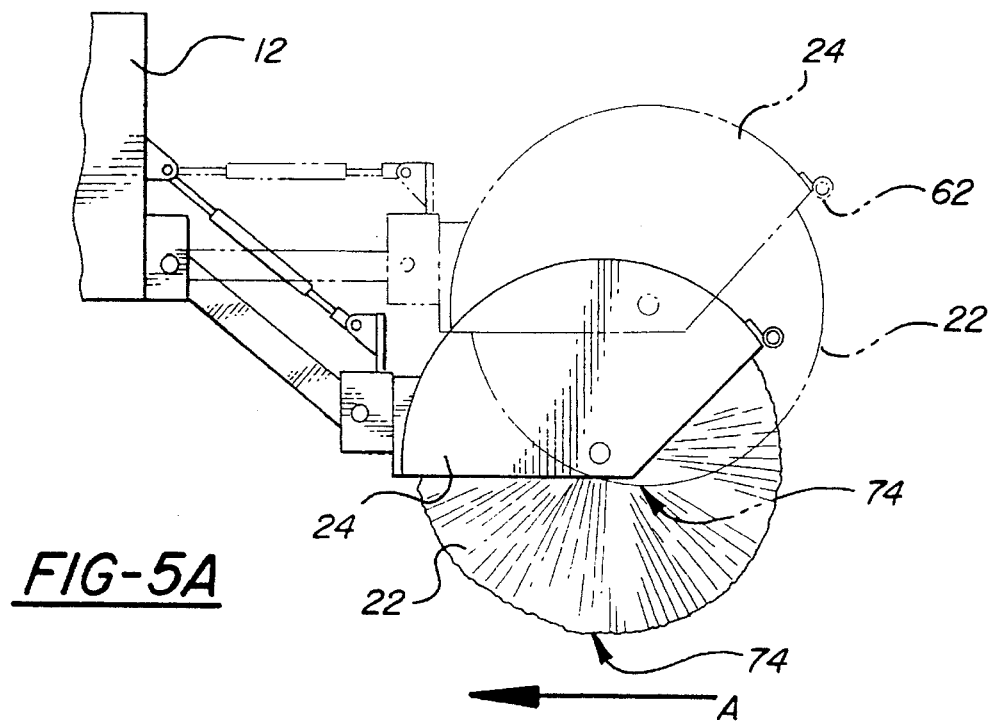
FIG. 5A illustrates the path of travel of a brush mounted in accord with the present invention.

The operation and advantage of the pivoting linkage of the present invention will be better illustrated by reference to FIGS. 5A and 5B. FIG. 5A depicts a tack-off brush 22 and hood 24 mounted in accord with the present invention. The brush and hood assembly is shown in a first position depicted in phantom outline and a second position in solid outline. It will be noted as the assembly is pivoted, the relationship of the hood 24 and support 12 is unchanged; and accordingly, the relationship thereof to the path of travel of a vehicle there past, indicated by arrow A, is also unchanged. Similarly, the contact point 74 of the brush 22, that is to say the point on the brush which is tangent to a vehicle passing there past along the path of travel A, is unchanged as the brush moves from the first to the second position. Thus it will be appreciated that the linkage of the present invention preserves the positional geometry of the brush system thereby allowing optimized conditions to be maintained throughout the operation of the machine.

Figure 5B:
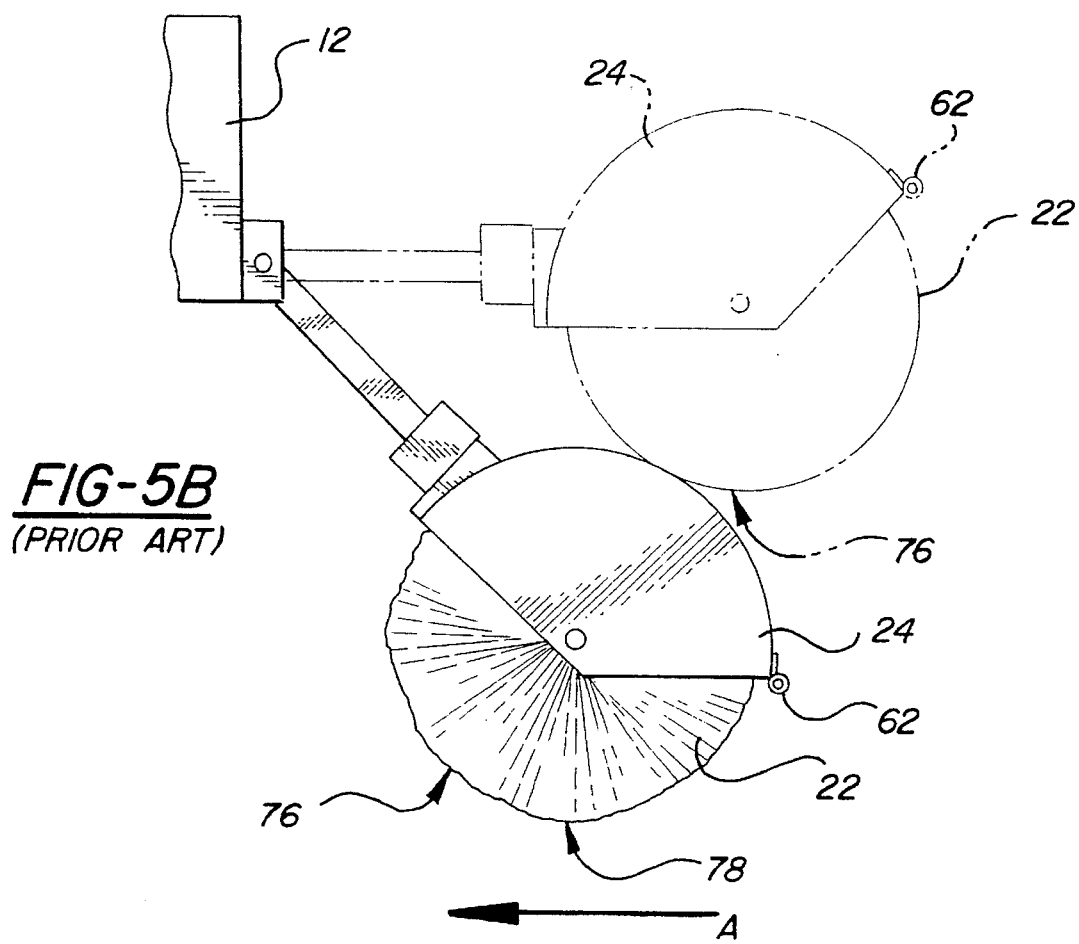
FIG. 5B depicts the path of travel of a brush utilizing a prior art mounting.

FIG. 5B depicts a prior art mounting system in which a brush 22 and hood 24 simply pivot about a support 12. In the FIG. 5B embodiment, the brush 22 and hood 24 are shown in a first position in phantom outline and in a second position in solid outline, as disposed with regard to the path of travel A of a vehicle there past. It will be noted that as the brush pivots to the second position the contact point shifts from location 76 to location 78. It is also significant that the orientation of the hood 24 changes greatly, and the ionization source 62 is positioned far differently with regard to the brush 22 and path of travel A as the assembly pivots. This change in geometry can result in damage to the vehicle from the hood 24. Additionally, the geometric relationship of the ionization source 62, brush 22, hood 24 and vehicle also changes thereby compromising the operation of the tack-off system.

In the operation of any tack-off system, it is essential that there be provided an exhaust for withdrawing collected particulate matter from the brush and hence from the region of the vehicle. A number of approaches have been implemented in the prior art in an effort to obtain a uniform and consistent air flow. U.S. Pat. No. 4,689,749 depicts a tack-off system which employs plural exhaust conduits associated with each tack-off brush. As noted above, conduits themselves can be a source of contamination and it is desirable to minimize their number. The present invention includes an exhaust plenum having a unique configuration which provides for establishment of a highly uniform flow of air through elongated slot via a single exhaust conduit. The plenum of the present invention is configured so as to establish a specifically shaped vortex region therewithin. This vortex functions as a variable choke which selectively restricts air flow through the exhaust slot to a greater degree proximate the exhaust conduit than at locations on the slot remote from the conduit.

Referring now to FIG. 6, there is shown a perspective view of one configuration of plenum 80 of the present invention. The plenum 80 includes a top wall which includes a first top wall segment 82, a second top wall segment 84 and a central segment 86 which is disposed between the first 82 and the second 84 segment and is contiguous with an edge of each. The central segment 86 includes an exhaust port 88 therein and in this embodiment, the exhaust port 88 is surrounded by a flange 90 which is coupled to a conduit, not shown. The plenum 80 includes a pair of side walls, one of which is indicated by reference numeral 92 and the other of which is not visible in this drawing. The plenum 80 also includes a bottom wall 94, a portion of which is visible in this drawing through the exhaust port 88. FIG. 7 provides a better depiction of the bottom wall 94, and it will be noted that the wall 94 includes an exhaust slot 96 defined therethrough. As illustrated, the bottom wall 94 may also include a set of adjustable baffles, which in this instance are segmented baffles 98a, 98b. The baffles may be employed to adjust the width of the slit and thereby control the velocity of the airflow therethrough.

The plenum of the present invention is particularly configured so that the walls thereof define an interior volume which is tapered along three mutually perpendicular axes so that the narrowest width dimension and the greatest length dimension of the interior volume are closest to the bottom wall and so that the greatest width dimension and the shortest length dimension are closest to the top wall.

The configuration of the plenum of the present invention will better be understood by reference to FIGS. 8A–8E which correspond to cross sectional views of the plenum of FIG. 6 taken along section lines 1—1, 3—3, 5—5, 7—7 and 9—9 respectively. It will be noted from the Figures that the side walls 92, 93 are inwardly tapered so as to form an obtuse interior angle with the bottom wall 94. Within the context of the present disclosure, an interior angle is defined as an angle formed by the walls of the plenum as measured therebetween within the interior volume enclosed thereby.

Figure 8A:
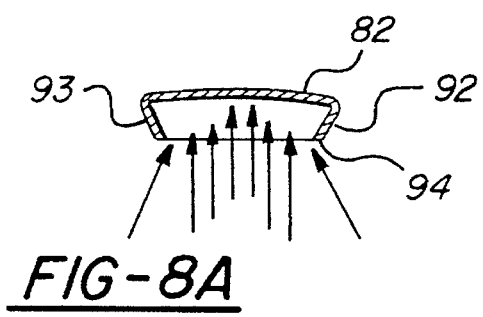
Figure 8B:
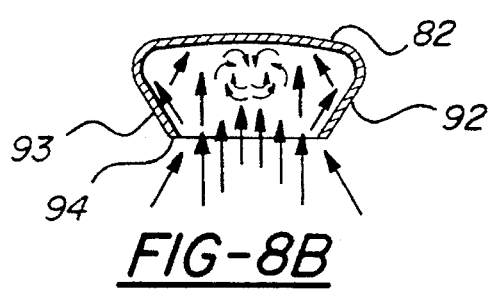
Figure 8C:
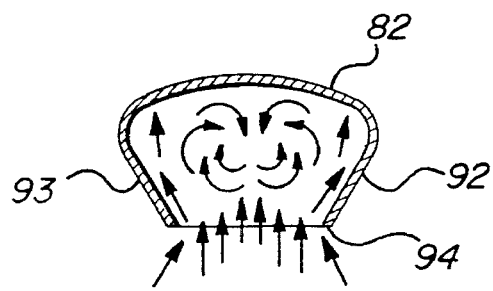
Figure 8D:
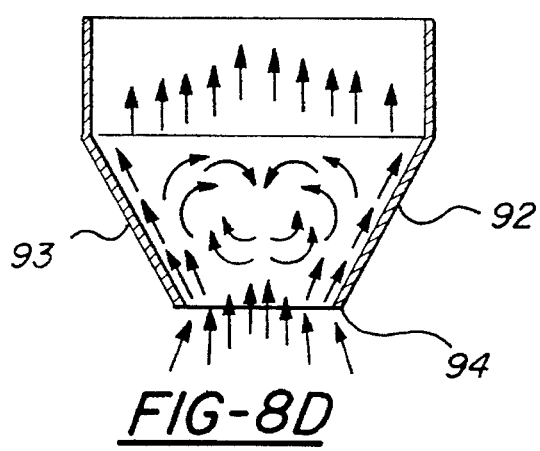

The first segment 82 and second segment 84 of the top wall are each tapered so that the width thereof varies from a maximum proximate the central segment, as shown in cross sectional view of FIG. 8C, to a minimum at a point distal the central segment, as shown in FIG. 8A. The first and second segments each are disposed so as to form an acute interior angle with the bottom wall 94 at their respective second ends.

This multiple taper geometry defines an interior volume and creates a region of turbulent flow therewithin, when air is drawn through the slot 94 in the bottom wall and out the exhaust port.

Figure 9:
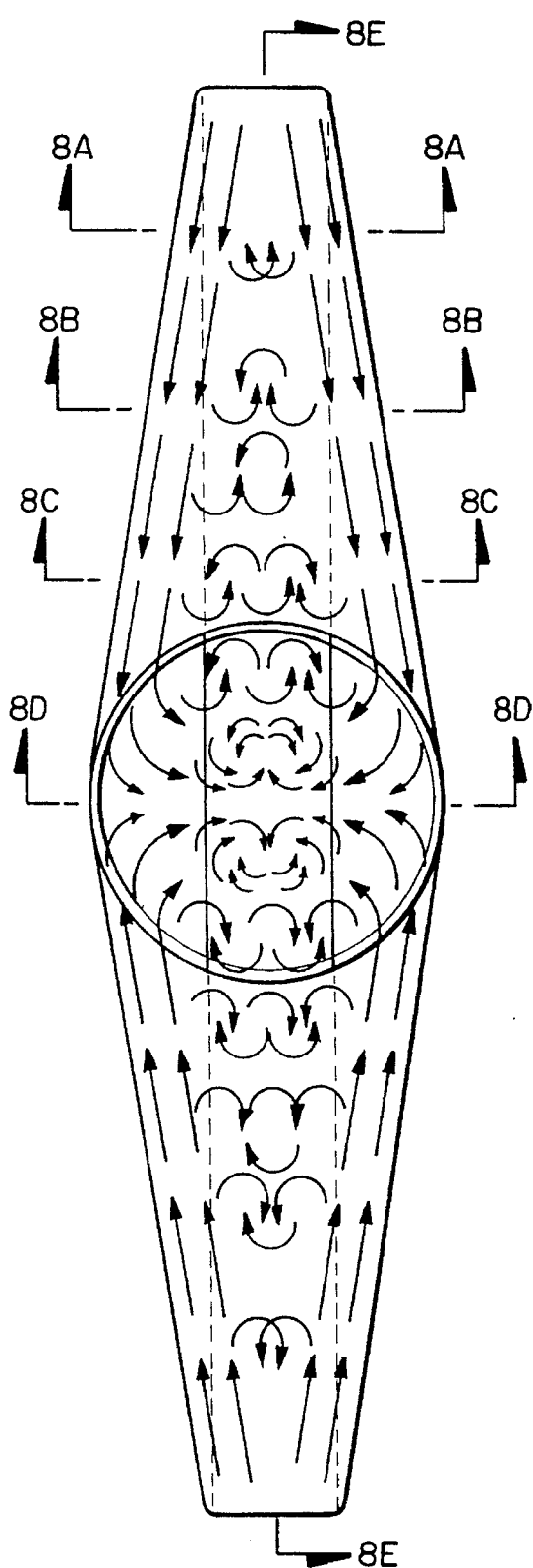
FIG. 9 is a top plan view of the plenum of FIG. 6, with the top wall removed, and showing the flow pattern of air passing therethrough.

FIG. 9 is a top view of the plenum with the top wall removed. The figure depicts the air flow in the interior volume. As will be apparent from the drawings of FIG. 8A–8E and 9, the turbulent flow region is greatest proximate the exhaust port and decreases toward the opposite ends of the plenum. The turbulent flow region creates an impedance to the direct flow of air therethrough and functions as a choke. It has been found, in accord with the present invention, that this particular geometry produces a choke effect which varies along the length of the slot of the plenum so as to provide an air flow having a uniform velocity therealong. In this manner, the present invention eliminates the need encountered in the prior art, to utilize multiple conduits in order to achieve a uniform flow of air through the hood of a tack-off brush.

The present invention provides a significantly improved tack-off machine. The machine of the present invention is highly efficient at removing and collecting particulate contaminants from a vehicle. Additionally, the system of the present invention can readily adjust for varying vehicular sizes and shapes without compromising its operational parameters. Additionally, the system of the present invention is particularly configured to minimize secondary contamination of the cleaned vehicle resultant from the system itself. These features are a result of the interaction of the various individual features of the present invention namely the minimization of conduits, the enclosure of conduits, the improved positioning system and the vortex enhanced plenum. These various features interact synergistically; however, may also be employed with some advantage individually. Additionally, these features may be incorporated in other apparatus with equal advantage. Therefore, it is to be understood that the invention may be practiced in combinations and embodiments other than those specifically shown herein. The discussion, description, and drawings herein are illustrative of the present invention, and are not limitations upon the practice thereof. It is the following claims, including all equivalents, which define the scope of the invention.

I claim:

1. In a tack-off machine of the type including a cylindrical tack-off brush which is rotatable about an axis thereof, an exhaust hood surrounding a portion of a circumference of the brush, and an exhaust plenum in communication with said hood, wherein the improvement comprises in combination, said exhaust plenum being a vortex moderated exhaust plenum which includes:

a top wall having an exhaust port therein, a bottom wall having an exhaust slit defined therein, a first side wall and a second side wall, said walls being configured, and disposed in cooperation, to define an interior volume which is tapered along three mutually perpendicular axes so that a narrowest width dimension and a greatest length dimension of said interior volume are closest to said bottom wall, and a greatest width dimension and a shortest length dimension of said interior volume are closest to said top wall, so that when air is drawn through said exhaust slit and out of said exhaust port, a variable region of turbulent flow is created in said interior volume, said turbulent flow having a maximum value proximate said exhaust port and a minimum value distal said exhaust port, whereby said turbulent flow creates a variable choke effect along the length of said slot so that the velocity of air flowing therethrough is constant along said length.

2. A tack-off machine as in claim 1, wherein said first and second side walls join said bottom wall at an obtuse interior angle.

3. A tack-off machine as in claim 1, wherein said exhaust port is disposed in a central portion of said top wall.

4. A tack-off machine as in claim 1, wherein said exhaust slit includes an adjustment baffle for varying the width thereof.

5. A tack-off machine for cleaning vehicles which pass along a path of travel therethrough, said machine comprising:

a support frame defining an opening configured to permit a vehicle to pass therethrough;

a generally cylindrical, top, tack-off brush supported on said frame for rotation about an axis transverse to the path of travel of said vehicle;

a drive system for rotating said top brush;

an exhaust hood disposed so as to surround a portion of the circumference of said top brush;

an exhaust blower;

flexible, expansible, exhaust conduit disposed to convey an exhaust stream from said hood to said blower, said conduit being supported and enclosed within said frame so that said conduit does not pass over said vehicle as said vehicle passes through said tack-off machine.

6. A tack-off machine as in claim 5, further including a brush positioning system for raising and lowering an axis of rotation of said top brush relative to said vehicle.

7. A tack-off machine as in claim 6, wherein said brush positioning system includes at least one track and wherein said brush positioning system is operable to guide the axis of rotation of said top brush along said track, while maintaining said axis transverse to the path of travel of the vehicle.

8. A tack-off machine as in claim 7, wherein said track is inclined at an acute angle relative to the path of travel of the vehicle so that the axis of rotation of said top brush moves forward and down in the direction of the path of travel of the vehicle through the tack-off machine.

9. A tack-off machine as in claim 5, further including a vertical tack-off brush supported by said frame for rotation about an axis which is generally vertical, and laterally spaced from the path of travel of said vehicle.

10. A tack-off machine as in claim 5, further including a generally cylindrical, angled tack-off brush supported by said frame for rotation about an axis which is inclined at an acute angle relative to the axis of rotation of said top brush.

11. A tack-off machine for cleaning vehicles which pass along a path of travel therethrough, said machine comprising:

a support frame defining an opening configured to permit a vehicle to pass therethrough;

a generally cylindrical tack-off brush having a length and a circumference, said brush being rotatable about a central axis of rotation and operable in use to contact a vehicle at a contact point on the circumference thereof as said vehicle passes through said support frame;

an exhaust hood extending along the length of said brush and surrounding a portion of the circumference thereof;

an exhaust conduit for withdrawing ambient air from said hood;

a support linkage for pivotably attaching said hood to said frame, said linkage including: a first arm having a first end pivotably connected to said frame and a second end pivotally connected to said hood; a second arm spaced from said first arm and having a first end pivotably connected to said frame and a second end pivotably connected to said hood wherein one of said first and second arms includes adjustment means for varying the length thereof;

an actuator in mechanical communication with said hood for pivoting said hood on said frame, whereby said first and second arms cause said hood and frame to maintain a fixed angular relationship as said hood is pivoted.

12. A tack-off machine as in claim 11, wherein said support linkage further includes a third arm, spaced from said first and second arms and having a first end pivotably connected to said frame and a second end pivotably connected to said hood.

13. A tack-off machine as in claim 12, wherein said first and second arms are laterally spaced and wherein said second and third arms are vertically spaced and rigidly joined together.

14. A tack-off machine for cleaning vehicles which pass along a path of travel therethrough, said machine comprising:

a support frame defining an opening configured to permit a vehicle to pass therethrough;

a generally cylindrical tack-off brush having a length and a circumference, said brush being rotatable about a central axis of rotation and operable in use to contact a vehicle at a contact point on the circumference thereof as said vehicle passes through said support frame;

an exhaust hood extending along the length of said brush and surrounding a portion of the circumference thereof;

an exhaust conduit for withdrawing ambient air from said hood;

a support linkage for pivotably attaching said hood to said frame, said linkage including: a first arm having a first end pivotably connected to said frame and a second end pivotally connected to said hood; a second arm spaced from said first arm and having a first end pivotably connected to said frame and a second end pivotably connected to said hood;

an actuator in mechanical communication with said hood for pivoting said hood on said frame, whereby said first and second arms cause said hood and frame to maintain a fixed angular relationship as said hood is pivoted so that the contact point of said brush does not change wherein said support linkage further includes a third arm, spaced from said first and second arms and having a first end pivotably connected to said frame and a second end pivotably connected to said hood.

15. A tack-off machine as in claim 14, wherein said actuator is mechanically connected to one of said first and second arms.

16. A tack-off machine as in claim 14, wherein said first and second arms are spaced apart in a parallel relationship.

17. A tack-off machine as in claim 14, wherein said hood includes an ionizer supported thereupon.

* * * * *